US012561078B1

(12) United States Patent
Gunda et al.

(10) Patent No.: US 12,561,078 B1
(45) Date of Patent: Feb. 24, 2026

(54) FLEXIBLE VOLUME PROVISIONING

(71) Applicant: Dell Products L.P., Round Rock, TX (US)

(72) Inventors: Kalyan C Gunda, Shrewsbury, MA (US); Xiao Le Shang, Shanghai (CN); Mikhail Borisov, Dublin (IE)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

(21) Appl. No.: 18/809,645

(22) Filed: Aug. 20, 2024

(51) Int. Cl.
*G06F 3/06* (2006.01)

(52) U.S. Cl.
CPC .......... *G06F 3/0631* (2013.01); *G06F 3/0619* (2013.01); *G06F 3/067* (2013.01)

(58) Field of Classification Search
None
See application file for complete search history.

(56) References Cited

U.S. PATENT DOCUMENTS

| | | | | |
|---|---|---|---|---|
| 9,678,683 B1 * | 6/2017 | Chen | .................. | G06F 9/45558 |
| 11,194,483 B1 * | 12/2021 | Dontu | ..................... | G06F 3/067 |
| 11,698,838 B1 * | 7/2023 | Kurata | ................ | G06F 11/1469 |
| | | | | 711/162 |

| | | | | |
|---|---|---|---|---|
| 2020/0241754 A1 * | 7/2020 | Bett | ........................ | G06F 3/067 |
| 2024/0061621 A1 * | 2/2024 | Flitsch | ................ | G06F 11/1448 |
| 2024/0403096 A1 * | 12/2024 | Bhatia | ................. | G06F 9/45558 |

OTHER PUBLICATIONS

Wen et al. (K8sES: Optimizing Kubernetes with Enhanced Storage Service-Level Objectives; pp. 214-222) IEEE 2023 (Year: 2023) 2023.*
Dell "Kubernetes and Containers" Dell Technologies, https://www.dell.com/en-us/lp/dt/workloads-kubernetes-containers, Last Accessed Aug. 18, 2024, 12 pages.

* cited by examiner

*Primary Examiner* — Kaushikkumar M Patel

(74) *Attorney, Agent, or Firm* — Amin, Turocy & Watson, LLP

(57) ABSTRACT

Described is technology that facilitates provisioning of persistent volumes for pods to be hosed at a node of a computer system. For instance, operations can be performed, comprising responding to a pod hosting request that comprises request data defining sub-requests for inclusion of respective persistent volumes in a pod, identifying persistent volumes that at least partially satisfy the pod hosting request, the persistent volumes being identified as being available via a data node, and allocating the persistent volumes to the pod to be hosted by the data node, wherein at least one sub-request, of the sub-requests, is satisfied by an operation other than allocating a respective persistent volume of the respective persistent volumes to the pod.

20 Claims, 10 Drawing Sheets

POD PROVISIONING PROCESS 300

500

IDENTIFYING, BY A SYSTEM, A POD HOSTING REQUEST. 502

BASED ON THE POD HOSTING REQUEST, CORRELATING, BY THE SYSTEM, AT LEAST ONE SUB-REQUEST, OF THE SUB-REQUESTS, CORRESPONDING TO THE POD HOSTING REQUEST, TO ANNOTATION DATA THAT INDICATES THAT THE AT LEAST ONE SUB-REQUEST IS OPTIONAL. 504

DETERMINING, BY THE SYSTEM, THAT THE ANNOTATION DATA FURTHER INDICATES THAT FAILING TO FULFILL THE AT LEAST ONE SUB-REQUEST BY FAILING TO FULFILL ALLOCATION OF A RESPECTIVE PERSISTENT VOLUME TO THE POD IS NOT THRESHOLD LIKELY TO CAUSE FAILURE OF INITIATION OF HOSTING OF THE POD AT THE DATA NODE. 506

BASED ON THE POD HOSTING REQUEST, CORRELATING, BY THE SYSTEM, THE SUB-REQUESTS, CORRESPONDING TO THE POD HOSTING REQUEST, TO RANKING DATA THAT DEFINES RANKINGS FOR THE SUB-REQUESTS THAT ARE COMPARABLE TO ONE ANOTHER. 508

BASED ON THE POD HOSTING REQUEST, ALLOCATING, BY THE SYSTEM, PERSISTENT VOLUMES OF A DATA NODE TO BE HOSTED AT A POD AT THE DATA NODE. 510

DETERMINING, BY THE SYSTEM, THAT AN ALLOCATION OF PERSISTENT VOLUMES FULFILLS LESS THAN ALL SUB-REQUESTS CORRESPONDING TO THE POD HOSTING REQUEST. 512

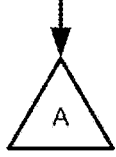

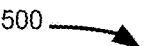

500 ⟶

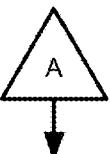

A

ALTERNATIVELY TO FULFILLING THE AT LEAST ONE SUB-REQUEST BY ALLOCATING A PERSISTENT VOLUME, INSTEAD CREATING, BY THE SYSTEM, A FAKE VOLUME USING A LOOP DEVICE OR OTHER DATA CONSTRUCT. <u>514</u>

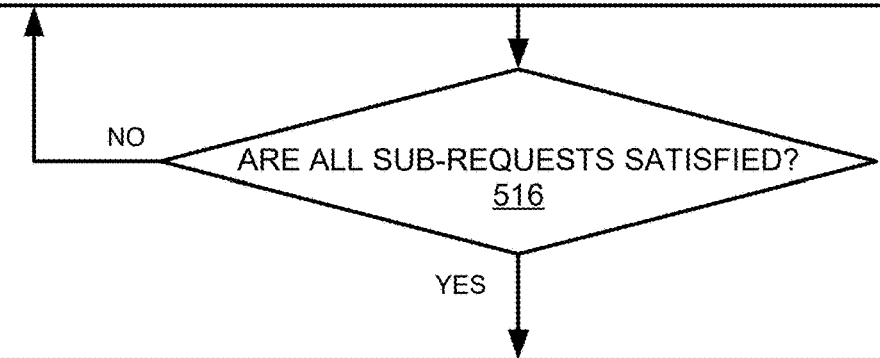

NO ⟵ ARE ALL SUB-REQUESTS SATISFIED?
<u>516</u>

YES

DIRECTING, BY THE SYSTEM, HOSTING OF THE POD OF THE PERSISTENT VOLUMES AT THE DATA NODE AFTER THE ALLOCATING OF THE PERSISTENT VOLUMES TO THE POD.   <u>518</u>

DIRECTING, BY THE SYSTEM, THE HOSTING AT THE POD AT THE DATA NODE BASED ON APPLICATION OF THE RANKINGS TO STORAGE CAPACITY AVAILABLE AT THE DATA NODE.   <u>520</u>

ACCESSING, BY A SYSTEM COMPRISING AT LEAST ONE PROCESSOR, A DATA STORE COMPRISING REQUEST DATA DEFINING SUB-REQUESTS FOR INCLUSION OF RESPECTIVE PERSISTENT VOLUMES IN A POD TO BE HOSTED AT A FIRST DATA NODE.   702

DETERMINING, BY THE SYSTEM, FROM THE DATA STORE, RANKING DATA ASSOCIATED WITH THE SUB-REQUESTS, WHEREIN THE RANKING DATA DEFINES RESPECTIVE RANKINGS BASED ON RESPECTIVE LEVELS OF IMPORTANCE OF THE INCLUSION OF THE RESPECTIVE PERSISTENT VOLUMES.   704

DETERMINING, BY THE SYSTEM, FROM THE DATA STORE, THAT AT LEAST ONE SUB-REQUEST, OF THE SUB-REQUESTS, IS ASSOCIATED WITH ANNOTATION DATA THAT LABELS THE AT LEAST ONE SUB-REQUEST AS OPTIONAL.   706

BASED ON THE SUB-REQUESTS AND THE RANKING DATA, ASSIGNING, BY THE SYSTEM, THE RESPECTIVE RANKINGS TO FIRST PERSISTENT VOLUMES AT THE FIRST DATA NODE AND TO OTHER PERSISTENT VOLUMES AT THE AT LEAST ONE SECOND DATA NODE.   708

IDENTIFYING, BY THE SYSTEM, PERSISTENT VOLUMES AT THE FIRST DATA NODE THAT AT LEAST PARTIALLY SATISFY THE POD HOSTING REQUEST AND AT THE AT LEAST ONE SECOND DATA NODE THAT AT LEAST PARTIALLY SATISFY THE POD HOSTING REQUEST, THE IDENTIFYING RESULTING IN IDENTIFIED PERSISTENT VOLUMES.   710

GENERATING, BY THE SYSTEM, SCORES BASED ON THE IDENTIFYING OF THE IDENTIFIED PERSISTENT VOLUMES.   712

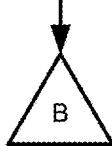

700

B

GENERATING, BY THE SYSTEM, SCORES FOR A FIRST DATA NODE AND FOR AT LEAST ONE SECOND DATA NODE, BASED ON AN AGGREGATION OF THE RESPECTIVE RANKINGS.   714

GENERATING, BY THE SYSTEM, A FIRST SCORE FOR THE FIRST DATA NODE BEING HIGHER THAN AT LEAST ONE SECOND SCORE FOR THE AT LEAST ONE SECOND DATA NODE, WHEREIN THE FIRST SCORE FOR THE FIRST DATA NODE IS BASED ON NON-ASSIGNMENT OF AT LEAST ONE RESPECTIVE RANKING RELATIVE TO AT LEAST ONE SUB-REQUEST OF THE SUB-REQUESTS.   716

ALLOCATING, BY THE SYSTEM, PERSISTENT VOLUMES ASSOCIATED WITH THE FIRST DATA NODE TO THE POD, BASED ON A HIGHER SCORE OF THE FIRST DATA NODE AS COMPARED TO A LOWER SCORE OF THE AT LEAST ONE OTHER NODE.   718

SATISFYING, BY THE SYSTEM, AT LEAST ONE SUB-REQUEST, OF THE SUB-REQUESTS, BY INITIATING AN ACTION OTHER THAN ALLOCATING A PERSISTENT VOLUME OF THE FIRST DATA NODE OR OF THE AT LEAST ONE SECOND DATA NODE TO THE POD.   720

SPOOFING, BY THE SYSTEM, AT A CREATION OF A PERSISTENT VOLUME FOR AT LEAST ONE OF THE SUB-REQUESTS COMPRISING MOUNTING A NON-VOLUME CONSTRUCT TO THE POD.   722

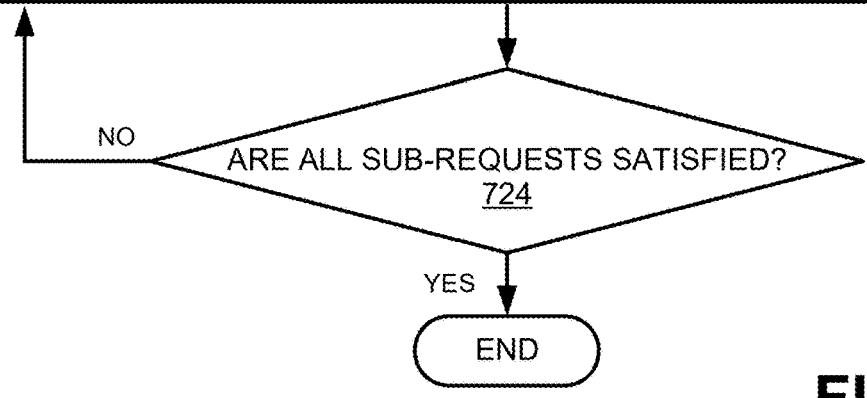

NO

ARE ALL SUB-REQUESTS SATISFIED? 724

YES

END

FIG. 8

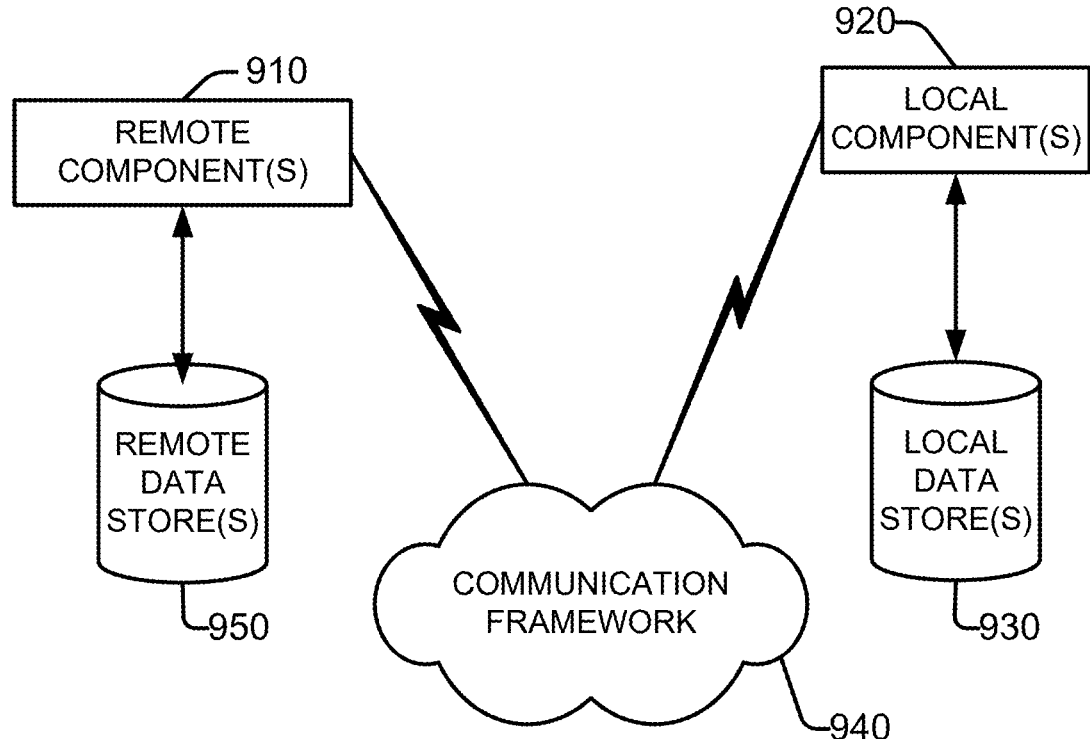
FIG. 9

FLEXIBLE VOLUME PROVISIONING

BACKGROUND

Provisioning, such as allocation and/or for use, of persistent volumes for being hosted at a node of a computer system can be limited by volume configurations and/or pod configurations that are required by a pod management system that manages the volumes and/or pods once invoked.

SUMMARY

The following presents a simplified summary of the disclosed subject matter to provide a basic understanding of one or more of the various embodiments described herein. This summary is not an extensive overview of the various embodiments. It is intended neither to identify key or critical elements of the various embodiments nor to delineate the scope of the various embodiments. Its sole purpose is to present one or more concepts of the disclosure in a streamlined form as a prelude to the more detailed description that is presented later.

Described herein are one or more frameworks directed to providing a set of operations that can be employed in parallel with use of a pod management system to allow for flexibility that is not allowed and/or provided by the pod management system.

As used herein, the term "pod" can refer to a cluster or other grouping of persistent volumes, where a pod can comprise one or more application containers. The pod management system can manage one or more containerized workload and/or services corresponding to one or more pods, and thus can manage the pods themselves.

An example system can comprise at least one processor, and at least one memory that stores executable instructions that, when executed by the at least one processor, facilitate performance of operations, comprising responding to a pod hosting request that comprises request data defining sub-requests for inclusion of respective persistent volumes in a pod, identifying persistent volumes that at least partially satisfy the pod hosting request, the persistent volumes being identified as being available via a data node, and allocating the persistent volumes to the pod to be hosted by the data node, wherein at least one sub-request, of the sub-requests, is satisfied by an operation other than allocating a respective persistent volume of the respective persistent volumes to the pod.

An example method, such as a computer-implemented method, can comprise accessing, by a system comprising at least one processor, a data store comprising request data defining sub-requests for inclusion of respective persistent volumes in a pod to be hosted at a first data node, determining, from the data store, ranking data associated with the sub-requests, wherein the ranking data defines respective rankings based on respective levels of importance of the inclusion of the respective persistent volumes, and generating scores for a first data node and for at least one second data node, based on an aggregation of the respective rankings.

An example non-transitory machine-readable medium can comprise executable instructions that, when executed by at least one processor facilitate performance of operations. The operations can comprise, based on a pod hosting request, allocating persistent volumes of a data node to be hosted at a pod at the data node, and directing hosting of the pod of the persistent volumes at the data node after the allocating of the persistent volumes to the pod, wherein the persistent volumes have been determined to fulfill less than all sub-requests corresponding to the pod hosting request.

An example benefit of one or more of the above-indicated method, system and/or non-transitory computer-readable medium can be an ability to provide a level of configuration of persistent volumes for a pod that is not enabled via existing frameworks. For example, this configuration can comprise ability to initiate hosting of a pod even in absence of a requested persistent volume. This could be, for example, in response to a failure of a disk associated with a persistent volume. The configuration, additionally and/or alternatively, can comprise ability to manage the pod by a pod management system along with the management of at least one other pod having a non-identical configuration to the pod. This can be accomplished without instead employing limited capacity for pods with such non-identical configurations, with varying hardware, software and/or firmware, and/or from varying generations of product.

Another example benefit of one or more of the above-indicated method, system and/or non-transitory computer-readable medium can be an ability to provide a spoofed persistent volume to account for unavailable capacity of a node, low priority of instantiation of a particular persistent volume, and/or failure of a disk associated with a persistent volume. In this way, a pod does not remain in a pending state indefinitely until conditions are met.

Yet another example benefit of one or more of the above-indicated method, system and/or non-transitory computer-readable medium can be an ability to provide the above-noted operations based on a low knowledge barrier for a user entity. That is, to instantiate a pod, a user entity need not have deep knowledge regarding investigation of a failed disk, regarding particular differences in node configurations, and/or regarding how to spoof a persistent volume. Rather, operations related thereto can be performed automatically by the one or more embodiments described herein. Indeed, the automatic operations can provide for flexible, adaptable and/or seamless provisioning of a pod in association with such low knowledge barrier for a user entity requesting the provisioning.

BRIEF DESCRIPTION OF THE DRAWINGS

The technology described herein is illustrated by way of example and not limited to the accompanying figures in which like reference numerals indicate similar elements.

FIG. 5 illustrates a process flow diagram of a method of configuration access control of an NAS control path, in accordance with one or more example embodiments and/or implementations described herein.

FIG. 6 illustrates a continuation of the process flow diagram of FIG. 5, in accordance with one or more example embodiments and/or implementations described herein.

FIG. 7 illustrates a process flow diagram of a method of configuration access control of an NAS control path, in accordance with one or more example embodiments and/or implementations described herein.

FIG. 8 illustrates a continuation of the process flow diagram of FIG. 7, in accordance with one or more example embodiments and/or implementations described herein.

FIG. 9 illustrates a block diagram of an example operating environment into which embodiments of the subject matter described herein can be incorporated.

DETAILED DESCRIPTION

Overview

Figure 1:
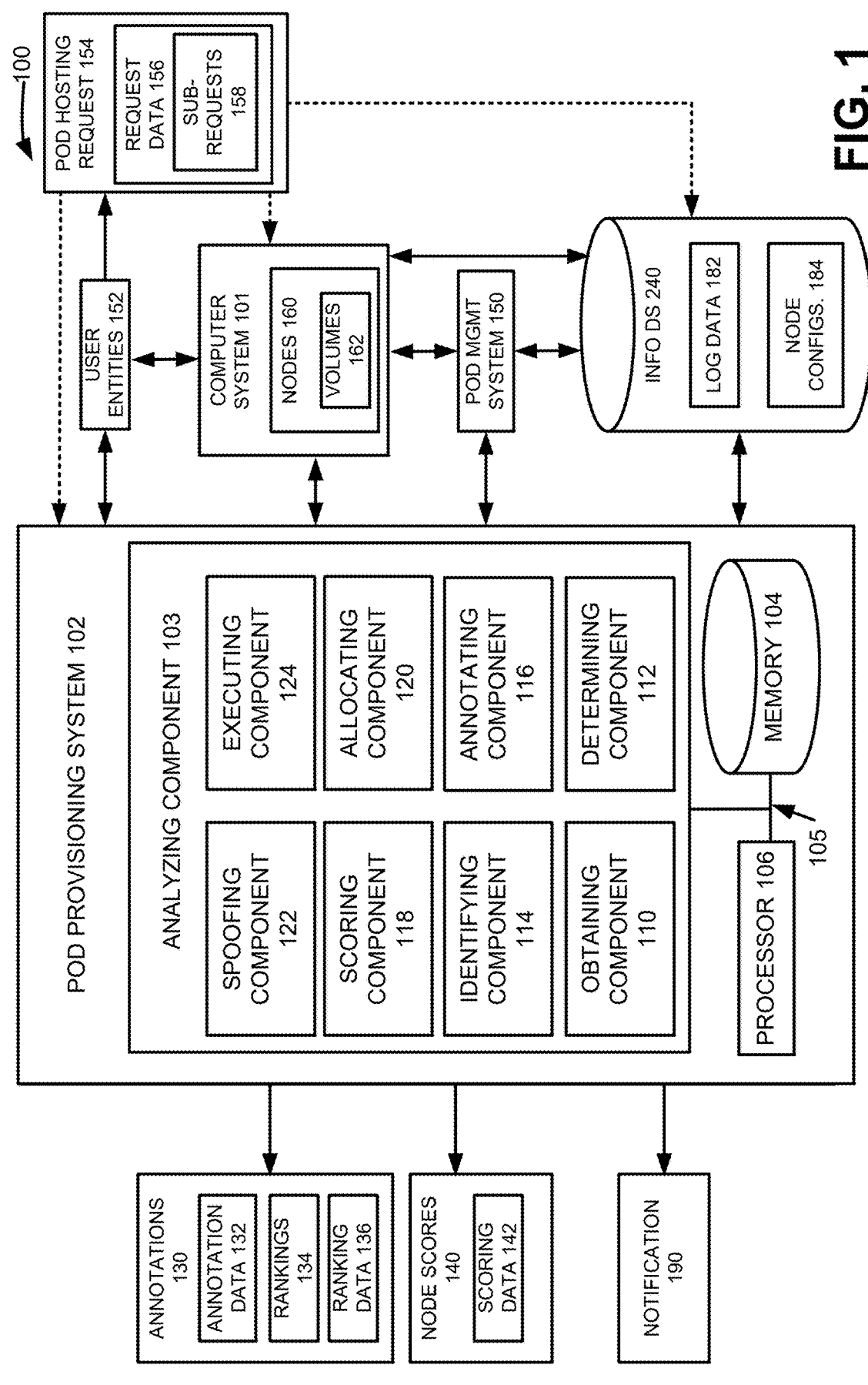
FIG. 1 illustrates a block diagram of an example, non-limiting system that can provide configuration access control of a control path corresponding to an NAS, and thus also use access control of an NAS, in accordance with one or more example embodiments described herein.

The technology described herein is generally directed towards systems, methods and/or computer program products for facilitating instantiation of a pod of one or more containers, comprising one or more persistent volumes that have been provisioned using one or more embodiments described herein.

Generally, in existing frameworks, the one or more persistent volumes are provisioned (e.g., identified, allocated and/or generated) based on a persistent volume template and/or request for a pod, resulting in a standardized format across all pods being hosted at a computer system and/or managed by a pod management system. Such volume provisioning approach can work well with public cloud vendors, as volumes can be directly provisioned from their storage infrastructure and hardware failures rarely impact persistent volume claim (PVC) availability.

However, when attempting to adopt this model in a private cloud environment, specifically with storage appliances based on existing pod management software, significant challenges can arise. For example, in private cloud storage appliances, it can be common to aggregate all storage disks within server nodes to support advanced storage use cases. In such scenario, volumes can be provisioned directly from the bare-metal server nodes. However, a challenge can arise when a disk failure occurs, as it directly impacts the availability of volumes utilized by pods. Likewise, challenges can arise in cases of attempting to employ hardware, software and/or firmware of varying generations, make, model, build, e.g., a non-heterogeneous hardware cluster where nodes may have different storage disks and/or capacities. That is, restrictions of existing pod management systems can impose limitations on starting pods using statefulsets, deployments and/or daemonsets.

That is, as alluded to above, existing volume readying (e.g., provisioning) frameworks follow the requirements and configurations of a corresponding pod management system or a pod can fail to be hosted and/or can fail after/during hosting. Accordingly, use of hardware, software and/or firmware of varying generations, make, model, etc. is limited, if not altogether prevented in existing frameworks. For example, such limits can comprise pods that can be run on nodes, but utilizing only a limited capacity, such as based on a node with a smallest capacity in a respective cluster. Another such limit can be allowance only of running pods on a subset of machines with identical configurations, with other pods of a respective cluster not running any pods.

Further, all resources can be required to be allocated before pod initiation in existing frameworks. That is, if a pod hosting request cannot be satisfied by existing volumes and/or creation of volumes, a corresponding pod cannot be hosted. Likewise, if a disk failure occurs, where the failure affect one or more volumes to be hosted, a persistent volume allocation issue can result in a pod being relegated to a pending state indefinitely.

In view of these deficiencies, it can therefore be desired to provide an example framework for more dynamic, more flexible and/or less rigid pod hosting. Accordingly, to account for one or more deficiencies of existing approaches, described herein are one or more example embodiments that can address persistent volume provisioning in manners that are suitable for use with existing pod management system restrictions, limitations, requirements and/or intricacies. That is, the one or more example embodiments described herein can provide for persistent volume identification, allocation, creation, annotating and/or spoofing in a manner that does not affect management of the volumes by an existing pod management system. Indeed, volumes provisioned, and pods hosted, based on operations performed by the one or more embodiments described herein are not limited to extreme restrictions of existing pod management systems.

As such, the one or more example frameworks described herein can be implemented as a plug-and-play process without being limited by structure, software, hardware, firmware, etc. of an existing pod management system. That is, the one or more example frameworks described herein can be hardware, software and/or vendor agnostic relative to different nodes, servers and/or machines at which such pods are to be hosted.

Generally, the one or more example embodiments described herein can provide for one or more of the following: ability to manage machine nodes with faulty disks, as disk failures can be common occurrences; support for different generations of machines with varying storage configurations within a single cluster; and/or optional cache volume capability within the cluster to enhance the processing of pod data. That is, the one or more example embodiments described herein can address insufficient available capacity to fulfill a pod's startup requirements and/or to fulfill all sub-requests of a pod hosting request.

For example, one or more of the above benefits can be accomplished by the one or more example embodiments described herein via use of annotations/metadata/flags associated with sub-requests for volumes, indicating that one or more volume requests are optional and that pod hosting is not to be failed absent provisioning of such volume. Additionally, and/or alternatively, the one or more example embodiments described herein can employ a system of ranking of sub-requests of a pod hosting request (e.g., pod requirements, configurations, etc.). Additionally, and/or alternatively, the one or more example embodiments described herein can employ a system of scoring of available nodes for hosting the pod, where the scoring can be based on node configuration, node storage capacity and/or the system of ranking of the sub-requests. Additionally, and/or alternatively, the one or more embodiments described herein can employ a spoofing operation to fake the allocation of a persistent volume that is indicated as being optional.

Accordingly, based one or more of these abilities, the one or more example embodiments described herein can determine a best fit node for pod hosting and can provision persistent volumes in one or more suitable manners that can account for restriction of existing pod management software that will be subsequently managing the hosted pod and/or containerized workloads and/or services associated therewith.

Terminology

As used herein, the terms "cost" or "expense" can refer to power, memory and/or processing power.

As used herein, the term "data" can comprise "metadata."

Reference throughout this specification to "embodiment," "one embodiment," "an embodiment," "one implementation," and/or "an implementation," means that a feature, structure, or characteristic described in connection with the embodiment/implementation can be included in at least one embodiment/implementation. Thus, the appearances of such a phrase "in one embodiment," "in an implementation," etc. in various places throughout this specification are not necessarily all referring to the same embodiment/implementation. Furthermore, the features, structures, or characteristics may be combined in any suitable manner in one or more embodiments/implementations.

As used herein, the terms "employing" or "employed by" can refer to an element (e.g., a hardware device) that is currently being employed, that has already been employed and/or that is to be employed.

As used herein, the term "entity" can refer to a machine, device, smart device, component, hardware, software and/or human. A "client entity" can refer to a client that stores and accesses data/metadata at a network access storage system. A "user entity," as use herein, can refer to a user of a control path of a network access storage system, such as for access to configurations of the NAS (e.g., for controlling use access by one or more client entities). An "administrator entity" can refer to an entity having permission for provision access to thereby provide information used by the one or more embodiments described herein to bound the configuration access by the user entities.

As used herein, the term "group" can refer to one or more.

A "group of hardware" or "equipment" can refer to a subset of hardware devices of an operation system, which hardware devices can comprise, but are not limited to, storage nodes, switch nodes, server nodes and/or corresponding communication devices, and which operation system can comprise one or more computing systems.

As used herein, with respect to any aforementioned and below mentioned uses, the term "in response to" can refer to any one or more states including, but not limited to: at the same time as, at least partially in parallel with, at least partially subsequent to and/or fully subsequent to, where suitable.

As used herein, the term "power" can refer to electrical and/or other source of power available to the operation system.

As used herein, the term "resource" can refer to power, money, memory, CPU bandwidth, processing power, labor, hardware and/or software.

As used herein, the term "set" can refer to one or more.

Example Architectures

One or more embodiments are now described with reference to the drawings, where like referenced numerals are used to refer to like elements throughout. In the following description, for purposes of explanation, numerous specific details are set forth to provide a more thorough understanding of the one or more embodiments. It is evident, however, in various cases, that the one or more embodiments can be practiced without these specific details.

Further, the embodiments depicted in one or more figures described herein are for illustration only, and as such, the architecture of embodiments is not limited to the systems, devices and/or components depicted therein, nor to any order, connection and/or coupling of systems, devices and/or components depicted therein. For example, in one or more embodiments, the non-limiting system architectures described, and/or systems thereof, can further comprise one or more computer and/or computing-based elements described herein with reference to an operating environment, such as the operating environment 1000 illustrated at FIG. 10. In one or more described embodiments, computer and/or computing-based elements can be used in connection with implementing one or more of the systems, devices, components and/or computer-implemented operations shown and/or described in connection with FIGS. 1-9 and/or with other figures described herein.

Figure 2:
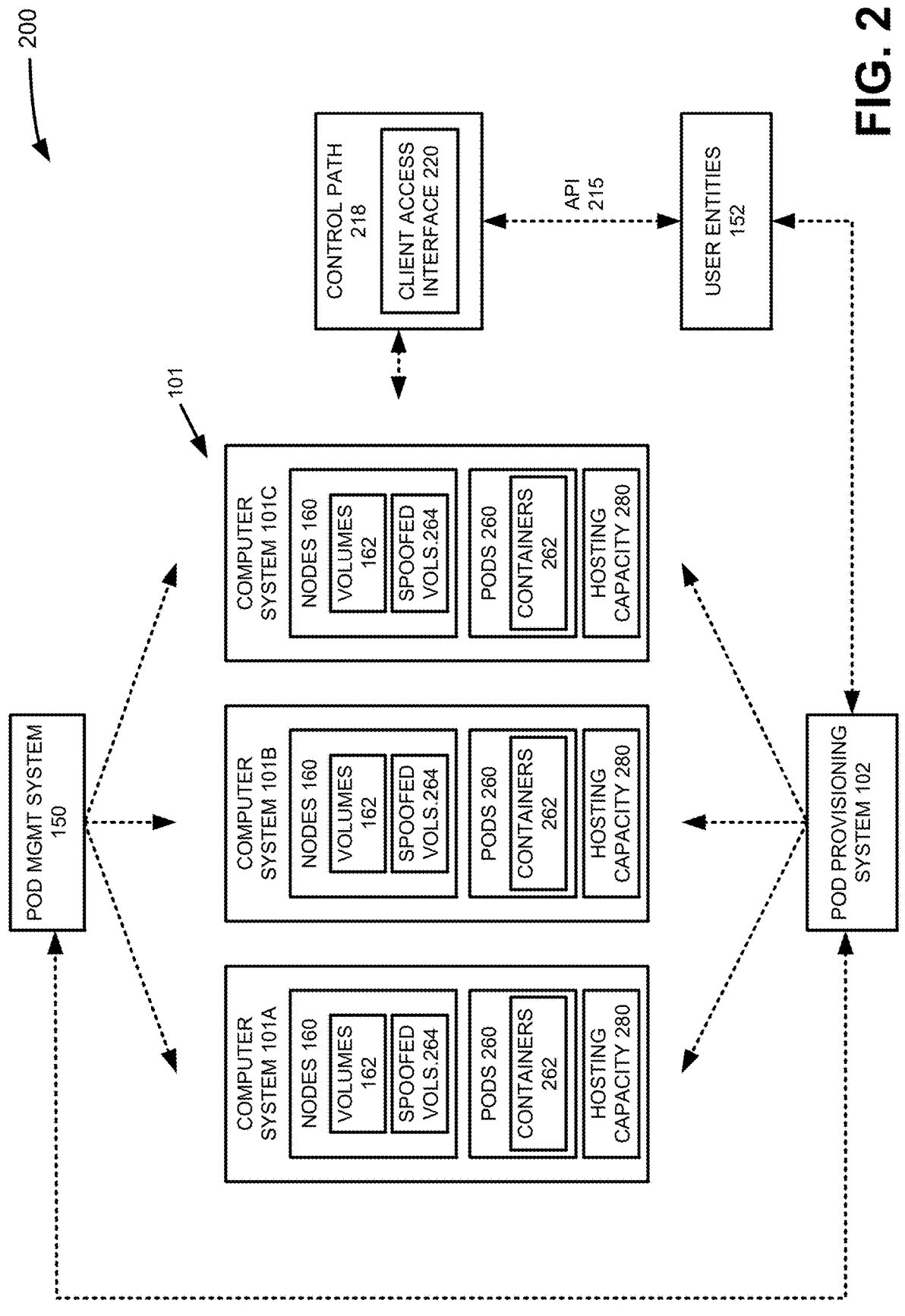
FIG. 2 illustrates a block diagram of an example, network access storage system (NAS), in accordance with one or more example embodiments described herein.

Turning now in particular to one or more figures, and first to FIG. 2, illustrated is an architecture 200 comprising a computer system 101, such as a server system, storage system, etc. More particularly, as illustrated, the architecture 200 can comprise a pod management system 150, a pod provisioning system 102 as described herein, and one or more computer systems 101 (e.g., computer system 101A, 101B and/or 101C).

The pod management system 150 (e.g., pod mgmt. system 150 at FIG. 2) can comprise any existing pod management system. A pod management system 150 can comprise and/or be a portable, extensible and/or open source platform for managing containerized workloads and/or services, such as in connection with a pod being hosted at a computer system 101. A pod management system 150 can facilitate declarative configuration and/or automation.

Briefly, a pod provisioning system 102 can provide one or more processes for provisioning one or more persistent volumes 162 (also herein referred to as volumes) for being hosted at a pod 260 at a computer system 101. A pod provisioning system 102 will be discussed below relative to FIGS. 1 and 3-8.

A computer system 101 can comprise any suitable hardware, software and/or firmware, such as servers, memory devices, processors, and/or other storage devices. The computer system 101 can comprise one or more nodes 160 and have a hosting capacity 280, such as a server capacity, storage capacity, etc. Based on the hosting capacity 280 at the one or more nodes 160, one or more volumes 162 can be divided, created, etc. One or more pods 260 can be allocated at the one or more nodes 160, which one or more pods 260 can comprise and/or facilitate one or more containers 262 that can be based on, and/or comprise, the one or more volumes 162. In one or more cases, a pod can comprise, and/or be associated with, one or more spoofed volumes 264, to be described below at least relative to FIG. 4.

Use of the architecture 200, and thus of a pod 260, can be by way of user entities 152 (FIG. 1) employing a suitable computing device for accessing a suitable client interface of the architecture 200. Relative to the use, a client access interface 220 of the architecture 200 can comprise various protocols, application programming interfaces (APIs), etc. for facilitating the use. Use can refer to the reading, writing, storing, modifying, copying, etc. of files and/or of operating of applications, services, etc. of a computer system 101.

Differently, the one or more embodiments described herein (e.g., Pod provisioning system 102) can employ one or more additional verification protocols based on a schedule comprising various access-based time windows for limiting, allowing, disallowing and/or controlling configuration access by a user entity 152 (e.g., by way of an API 215) to the control path 218.

Turning next to FIG. 1, the figure illustrates a block diagram of an example, non-limiting system 100 that can facilitate control of configuration access to an NAS control path 218. In one or more embodiments, the control path 218 can be referred to as comprising the client access interface 220, and/or can be separate therefrom. The control path 218 can comprise any suitable hardware, firmware, software, etc.

FIG. 1 illustrates the non-limiting system 100 comprising a pod provisioning system 102 that can function to generally provide one or more processes for provisioning one or more persistent volumes 162 (also herein referred to as volumes) for being hosted at a pod 260 of at least one node 160 at a computer system 101, as noted above.

The non-limiting system 100, as illustrated, further can comprise the computer system 101 and/or pod management system 150, and/or one or both of these elements can be external to the non-limiting system 100. In one or more embodiments, the pod provisioning system 102 can be hosted at the computer system 101. Additionally, and/or alternatively, in one or more embodiments, the pod management system 150 can be hosted at the computer system 101.

The non-limiting system 100, as illustrated, can further comprise an information datastore 240 (info ds 240 at FIG. 1) that can comprise any suitable hardware, software and/or firmware for providing at least storage and recall of information comprising data and/or metadata. The information datastore 240 can be comprised by, and/or be external to, the pod provisioning system 102 and/or non-limiting system 100, such as at least being communicatively accessible by the pod provisioning system 102, pod management system 140 and/or computer system 101.

Generally, the pod provisioning system 102 can comprise any suitable computing devices, hardware, software, operating systems, drivers, network interfaces and/or so forth. As illustrated, the pod provisioning system 102 can comprise an obtaining component 110, determining component 112, identifying component 114, annotating component 116, scoring component 118, allocating component 120, spoofing component 122 and/or executing component 124. These components can be comprised by a processor 104, and/or one or more of these components can be external to the processor 104. A bus 105 can operatively couple the processor 104 and a memory 106.

Communication among the components of the pod provisioning system 102 can be by any suitable method. Communication can be facilitated by wired and/or wireless methods including, but not limited to, employing a cellular network, a WAN (e.g., the Internet), and/or a LAN. Suitable wired or wireless technologies for facilitating the communications can include, without being limited to, Wi-Fi, GSM, UMTS, WiMAX, enhanced GPRS, 3GPPLTE, 3GPP2UMB, HSPA, ZIGBEE® and other 802.XX wireless technologies and/or legacy telecommunication technologies, BLUETOOTH®, SIP, RF4CE protocol, WirelessHART protocol, 6LoWPAN, Z-Wave, an ANT protocol, a UWB standard/protocol and/or other proprietary and/or non-proprietary communication protocols.

Discussion first turns to the processor 104, memory 106 and bus 105 of the pod provisioning system 102.

In one or more embodiments, the pod provisioning system 102 can comprise a processor 104 (e.g., computer processing unit, microprocessor, classical processor and/or like processor). In one or more embodiments, the processor 104 can be and/or be comprised by a controller.

In one or more embodiments, a component (which also can be referred to as a module) associated with pod provisioning system 102, as described herein with or without reference to the one or more figures of the one or more embodiments, can comprise one or more computer and/or machine readable, writable and/or executable components and/or instructions that can be executed by processor 104 to facilitate performance of one or more processes defined by such component and/or instruction.

In one or more embodiments, the pod provisioning system 102 can comprise a machine-readable memory 106 that can be operably connected to the processor 104. The memory 106 can store computer-executable instructions that, upon execution by the processor 104, can cause the processor 104 and/or one or more other components of the pod provisioning system 102 to perform one or more actions. In one or more embodiments, the memory 106 can store computer-executable components.

The pod provisioning system 102 and/or a component thereof as described herein, can be communicatively, electrically, operatively, optically and/or otherwise coupled to one another via a bus 105 to perform functions of non-limiting system architecture 100, pod provisioning system 102 and/or one or more components thereof and/or coupled therewith. Bus 105 can comprise one or more of a memory bus, memory controller, peripheral bus, external bus, local bus and/or another type of bus that can employ one or more bus architectures. One or more of these examples of bus 105 can be employed to implement one or more embodiments described herein.

In one or more embodiments, pod provisioning system 102 can be coupled (e.g., communicatively, electrically, operatively, optically and/or like function) to one or more external systems (e.g., a system management application), sources and/or devices (e.g., classical communication devices and/or like devices), such as via a network. In one or more embodiments, one or more of the components of the pod provisioning system 102 can reside in the cloud, and/or can reside locally in a local computing environment (e.g., at a specified location).

In addition to the processor 104 and/or memory 106 described above, the pod provisioning system 102 can comprise one or more computer and/or machine readable, writable and/or executable components and/or instructions that, when executed by processor 104, can facilitate performance of one or more operations defined by such component and/or instruction.

It is noted that in one or more embodiments, the obtaining component 110, determining component 112, identifying component 114, annotating component 116, scoring component 118, allocating component 120, spoofing component 122 and/or executing component 124 can be implemented independently, without one or more other of the obtaining component 110, determining component 112, identifying component 114, annotating component 116, scoring component 118, allocating component 120, spoofing component 122 and/or executing component 124. Additionally and/or alternatively, the obtaining component 110, determining component 112, identifying component 114, annotating component 116, scoring component 118, allocating component 120, spoofing component 122 and/or executing component 124 can be comprised by a high-level analyzing component 103, one or more of the below-described functions of the obtaining component 110, determining component 112, identifying component 114, annotating component 116, scoring component 118, allocating component 120, spoofing component 122 and/or executing component 124 can be performed by the high-level analyzing component 103, and/or one or more of the obtaining component 110, determining component 112, identifying component 114, annotating component 116, scoring component 118, allocating component 120, spoofing component 122 and/or executing component 124 can be omitted with the high-level analyzing component 103 performing one or more of the below-described functions of the one or more omitted obtaining component 110, determining component 112, identifying component 114, annotating component 116, scoring component 118, allocating component 120, spoofing component 122 and/or executing component 124.

Figure 3:
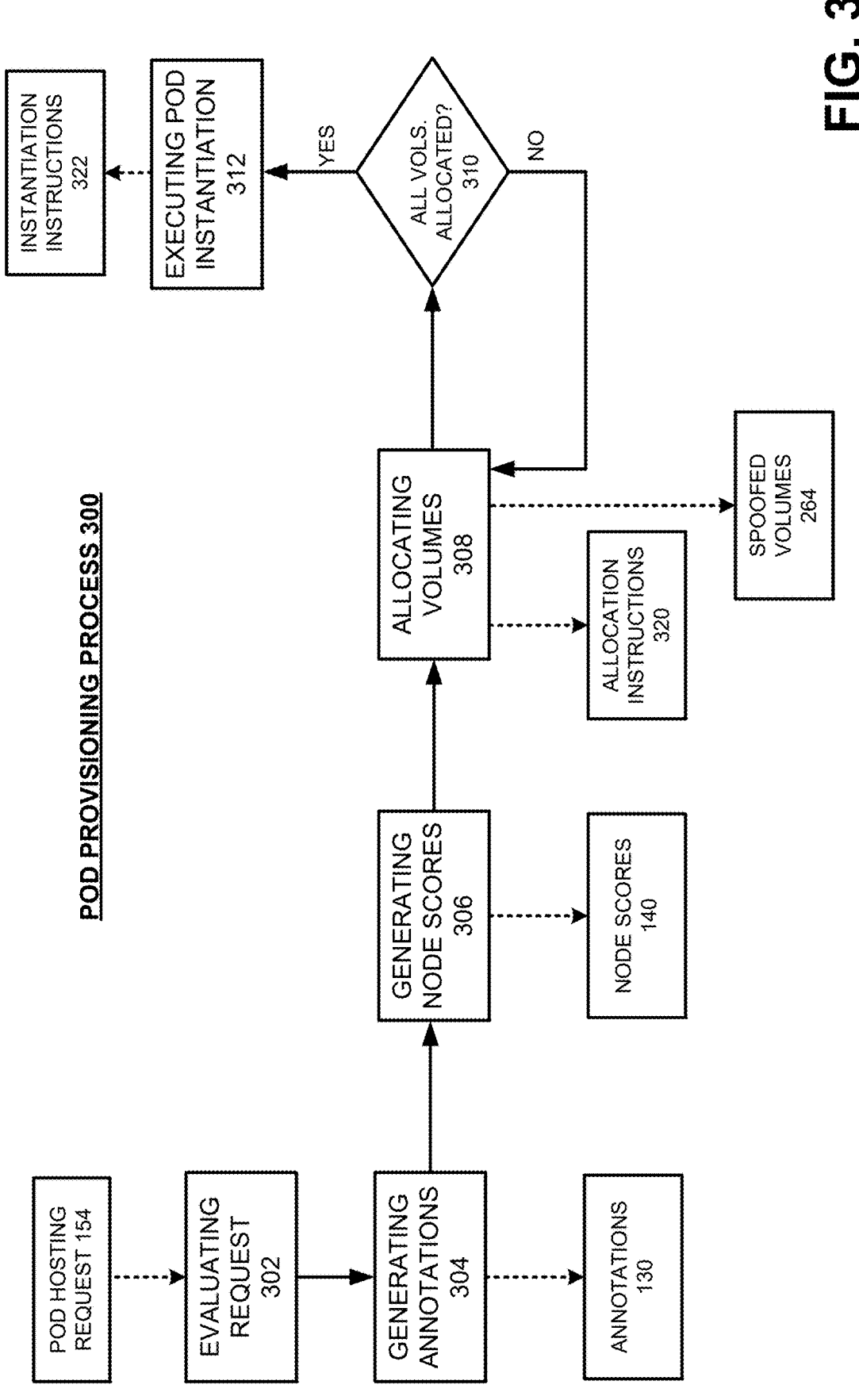
FIG. 3 illustrates a schematic diagram of an access data generation process for generating a schedule used for controlling configuration access to an NAS control path, in accordance with one or more example embodiments described herein.

Direction next turns to a pod provisioning process 300, illustrated at FIG. 3, as well as still referring to FIGS. 1 and 2. The pod provisioning process 300 generally can be provided by the pod provisioning system 102 to satisfy one or more pod hosting requirements and/or one or more sub-requests 158 comprised by request data 156 of a pod hosting request 154. In this way, a pod 160 can be hosted at at least one node 160 of a computer system 101 and managed by a pod management system 150 even if one or more sub-requests 158 are not satisfied and/or even in a case of a failed disk (and/or other hardware, software and/or firmware issue) preventing use and/or allocation of a persistent volume 162.

Relative to FIG. 3, one or more user entities 152 can use a computing device to access the information data store 240 to provide request data 156 to the information datastore 240. It is noted that any suitable method of storage can be employed at the information data store 240. Data stored can be in any suitable format and can comprise data and/or metadata. In one or more embodiments, two or more information data stores 240 can be employed to store input data 302 for use by the pod provisioning system 102.

In one or more other embodiments, a pod hosting request 154 instead can be submitted to at least one of the computer system 101, pod management system 150 and/or pod provisioning system 102. In one or more embodiments, the pod provisioning system 102 can access and/or intercept the pod hosting request 154, such as based on communicative access of the pod provisioning system 102 to the computer system 101, pod management system 140 and/or information datastore 240.

For example, the obtaining component 110 can access, identify, find, receive, search, request and/or otherwise generally obtain the pod hosting request 154. The pod hosting request 154 can comprise data and/or metadata in any suitable format. The pod hosting request 154 can, for example, comprise request data 156 that defines one or more sub-requests 158. The sub-requests 158 can specify allocation and/or inclusion of one or more persistent volumes 162 in a pod. Additionally, and/or alternatively, the sub-requests 158 can specify one or more pod hosting and/or persistent volume configurations, requirements, etc.

At step 302, the determining component 112 can evaluate the pod hosting request 154. This can comprise determining, such as by the request data 156, what persistent volumes 162 and/or what volume configurations are being requested for the hosting of the requested pod 260. This also can comprise determining, such as by the request data 156, whether one or more sub-requests 158 are to be indicated as optional and whether one or more sub-requests 158 have rankings 134 associated therewith.

At step 304, based on the one or more operations performed by the determining component 112, the annotating component 116 can generate one or more annotations 130, particularly generating and/or updating annotation data 132 associated with the one or more sub-requests 158. That is, in one or more embodiments, the request data 156 can comprise annotation data 132. The annotation data 132 can define one or more annotations 130 that can point to and/or otherwise tag one or more sub-requests 158 as being optional. In one or more embodiments, the annotations 130 can comprise additional indication (e.g., in the annotation data 132) that instantiation of a pod 260 is not to be withheld, stalled, blocked, etc. due to non-allocation of the respective persistent volume 162 being requested in the respective sub-request 158. In one or more embodiments, this non-allocation can require instead, if a persistent volume 162 cannot be allocated to satisfy the respective sub-request 158, that a spoofed volume 164 be generated based on a data construct 430, to be discussed below relative to FIG. 4. In one or more other embodiments, this non-allocation can allow for the no allocation of a true persistent volume 162 or fake persistent volume 164, if a persistent volume 162 cannot be allocated to satisfy the respective sub-request 158.

Additionally, and/or alternatively, the annotating component 116 can generate one or more rankings 134, particularly generating and/or updating ranking data 136 associated with the one or more sub-requests 158. That is, in one or more embodiments, the request data 156 can comprise ranking data 136. The ranking data 136 can define one or more rankings or other priority and/or hierarchy indicators for the various sub-requests 158 relative to one another and/or relative to a default baseline. Any suitable system of rankings 134 can be employed, such as in a range from 0 to 1, in a range from 0 to 10, numerical, alphabetical, alphanumeric, etc.

In one or more embodiments, based on the generating of annotations at step 304, the determining component 112 can correlate at least one sub-request 158, of the sub-requests 158, to respective annotation data 132. Likewise, the determining component 112 can correlate at least one sub-request 158, of the sub-requests 158, to respective ranking data 136. This can comprise generating a prioritized order of sub-requests 158 based on the rankings 134, such as where persistent volumes 162 can be at least partially allocated in an order corresponding to the rankings 134. The correlations can be stored as log data 182 at the information datastore 240, for example. The correlating can comprise generating log data 182 that notes one or more indications from the annotation data 132, such as that failing to fulfill the at least one sub-request 158 by failing to fulfill allocation of a respective persistent volume 162 to the pod 260 is not threshold likely to cause failure of initiation of hosting of the pod 260 at a data node 160.

Based on the correlations performed by the determining component 112, the identifying component 114 can analyze node configurations 184, such as stored at the information data store 240 and/or at the computer system 101, corresponding to nodes 160 at the computer system 101. The node configurations 184 can be compared, by the identifying component 114, to the request data 156 of the sub-requests 158, such as to configurations for persistent volume allocation associated with the request data 156. Based thereon, the identifying component 114 can evaluate at least a group of, or all of, nodes 160 and volumes 162 comprised thereby at the computer system 101.

In one or more embodiments, the identifying component 114 can identify one or more persistent volumes 162 that are already divided at the one or more nodes 160 that can satisfy one or more sub-requests 158. In one or more embodiments, the identifying component 114 can determine that a persistent volume 162 is not already comprised by a node 160, but that the node 160 has suitable hosting capacity 280 to allow for generation of a persistent volume 162 at the node 160. In one or more embodiments, the identifying component 114 can determine that a persistent volume 162 is not already comprised by a node 160 and also that the node 160 does not have suitable hosting capacity 280 to allow for generation of a persistent volume 162 at the node 160.

At step 306, generating of node scores 140, and more particularly generating and/or writing of scoring data 142, can be performed by the scoring component 118. This can be based on the identified persistent volumes 162 and/or identified suitable hosting capacity 280 resulting from the one or more operations performed by the identifying component 114. Scoring data 142 can employ any suitable scoring method, such as a range form 0 to 1, a range from 0 to 10, and or a range from 0 to 100, with any suitable delineations therebetween. In one or more cases, to prioritize smaller priority numbers as higher priority, rankings 134 can be inverted, such as by subtracting them from 100. In one or more cases, a score 140 can be based on an aggregation of rankings 134. In one or more cases, a score 140 can additionally, and/or alternatively, be based on comparison of node configurations 184 to persistent volume and/or node configurations associated with the request data 156 of the corresponding pod hosting request 154.

In one example, provided below at Table I, a pod hosting request 154 can comprise a set of four sub-requests 1-4. The sub-requests 1-4 can be ranked from 0 to 100 based on desire to be provisioned. For example, sub-request 1 can have a rank of 90, sub-request 2 can have a rank of 80, sub-request 3 can have a rank of 70, and sub-request 4 can have a rank of 60. As such, node scores 140 can be calculated by the scoring component 118 based on an aggregation of rankings 134. Alternatively, the numbers 90, 80, 70 and 60 at Table I can be based on matching of node configurations 184 with request data 156 configurations.

TABLE I

|  | Node1 | Node2 | Node3 | Node4 |
|---|---|---|---|---|
| Sub-Request 1 | Yes (90) | Yes (90) | No | Yes (90) |
| Sub-Request 2 | No | Yes (80) | No | No |
| Sub-Request 3 | Yes (70) | No | Yes (70) | Yes (70) |
| Sub-Request 4 | No | No | Yes (60) | Yes (60) |
| Node Score | 160 | 170 | 130 | 220 |

The identifying component 114 can have identified a set of four different nodes 1-4 at a same and/or different computer system 101 (e.g., computer systems 101A, 101B and/or 101C of FIG. 2). Based on rankings 134 and/or node configurations 184, the scoring component 118 can generate scores 140 as provided at Table I.

At Table I, it is noted that no available node 1-4 can satisfy all of the sub-requests 1-4. Node 1 cannot satisfy sub-request 2 or sub-request 4. Node 2 cannot satisfy sub-request 3 or sub-request 4. Node 3 cannot satisfy sub-request 1 or sub-request 2. Node 4 cannot satisfy only sub-request 2. Accordingly, based on at least initial scoring, absent consideration of spoofing a persistent volume, node 4 has a highest score of 220. That is, to provide the most use and benefit to a user entity 152, scoring 140 can be based on true persistent volumes 162 being available, rather than use of spoofed volumes 162 that do not provide use/benefit to a user entity 152.

In one or more cases, each of the sub-requests 1-4 can be optional, and thus any one or more of the non-satisfied sub-requests 1-4 (indicates as "No" at Table I), can be satisfied by use of a spoofed volume 162. It is noted that such spoofed volume 162 will not provide benefit to the user entity 152, but that use of such spoofed volume 162 can at least allow for instantiation of a respective pod 160 without the pod instantiation being stalled.

It will be appreciated that steps 302, 304 and/or 306 can be performed in a different order and/or at least partially at a same time as at least one other of the steps 302, 304 and 306.

At step 308, the allocating component 120 can perform allocating of one or more persistent volumes 162 based on the resultant output of the scoring component 118. With respect to Table I, this can be allocation of three persistent volumes 162 at node 4 corresponding to sub-requests 1, 3 and 4. Generally, allocation can comprise generating one or more allocation instructions 320 to be transmitted to and/or made available to the computer device 101 and/or the pod management system 150. The one or more allocation instructions 320 can direct allocation of the one or more persistent volumes 162 at one or more nodes 160 in accordance with the highest scoring node 160 as determined by the scoring component 118. In such case, the computer device 101 and/or the pod management system 150 can mount the respective persistent volumes 162 to relative to a pod 260. In one or more other embodiments, the pod provisioning system 102 (e.g., the allocating component 120) can perform the mounting of one or more such persistent volumes 162.

In one or more embodiments, the allocating of volumes at step 308 can additionally and/or alternatively comprise generating one or more allocation instructions 320 directed to the spoofing component 122. That is, the one or more allocation instructions 320 can instruct the spoofing component 122 perform one or more operations for faking (e.g., spoofing) a persistent volume 162 that has an annotation 130 associated therewith indicating that such persistent volume 162/sub-request 158 is optional.

Figure 4:
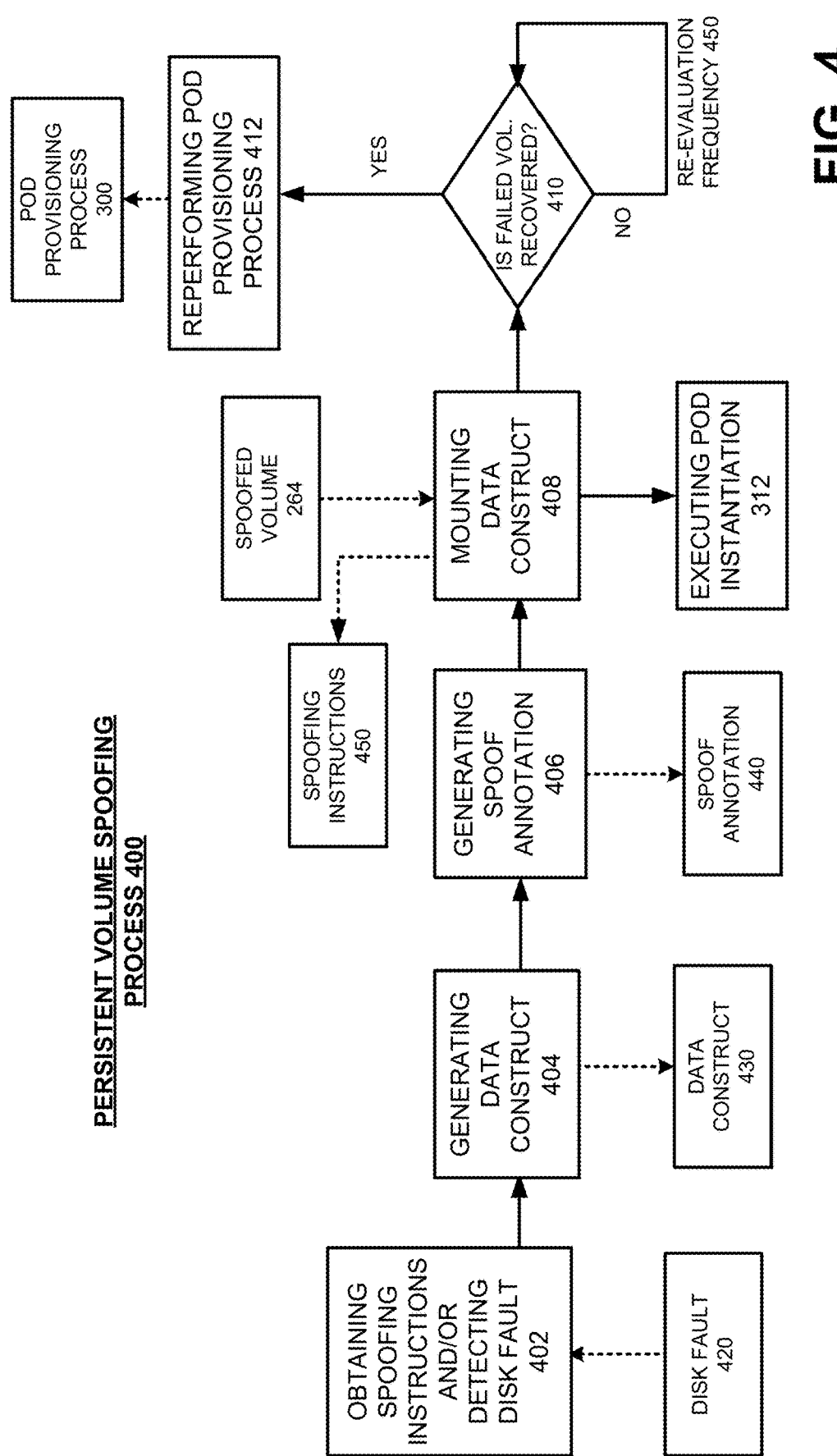
FIG. 4 illustrates a schematic diagram of a configuration access execution process for controlling configuration access to an NAS control path, in accordance with one or more example embodiments described herein.

Turning next to FIG. 4, and also still to FIGS. 1-3, a persistent volume spoofing process 400 is illustrated that can be performed by the spoofing component 122 in connection with the one or more allocation instructions 320. The persistent volume spoofing process 400 generally can be provided by the pod provisioning system 102 to fake (e.g., spoof) allocation of a persistent volume 162 that has been annotated via one or more annotations 130 as being optional to provisioning of the requested pod 260.

At step 402, the spoofing component 122 can detect a disk fault 420 and/or can obtain one or more of the spoofing instructions 320. For example, the trigger to generate a spoofed volume 264 can be based on that a persistent volume 162 and/or hosting capacity 280 is not available at a selected node 160 (e.g., selected by the scoring component 120). Thus, a specific trigger in such case can be an allocation instruction 32. Additionally, and/or alternatively, a trigger to generate a spoofed volume 264 can be based on detection a disk fault 420, where the trigger can specifically be the detection of the disk fault 420. For example, after allocation of a true persistent volume 162 (e.g., not spoofed; accessible) and before instantiation of the respective pod 260, the disk fault 420 can occur, thereby affecting the true persistent volume 162.

Accordingly, at step 404, the spoofing component 122 can generate and/or employ a data construct 430, such as a loop device.

At step 406, the spoofing component 122 can generate a spoof annotation 440 to tag the data construct 430 as being fake and/or inaccessible.

It will be appreciated that steps 406 and 404 can be performed in a different order and/or at least partially at a same time as one another.

At step 408, the spoofing component 122 can perform one or more operations that can result in the spoofed volume 264 being mounted relative to the pod 260. For example, the spoofing component 122 can generate one or more spoofing instructions 450 to be transmitted to and/or made available to the computer device 101 and/or the pod management system 150. The one or more spoofing instructions 450 can direct the mounting of the one or more spoofed persistent volumes 264. In such case, the computer device 101 and/or the pod management system 150 can mount the respective spoofed persistent volumes 264 to relative to a pod 260. In one or more other embodiments, the pod provisioning system 102 (e.g., the spoofing component 122) can perform the mounting of one or more such spoofed persistent volumes 264.

Turning back to FIG. 3, at step 310, based on the mounting of the one or more true (e.g., accessible) persistent volumes 162 and/or spoofed persistent volumes 264, the executing component 124 can determine whether or not all sub-requests 158, associated with the pod hosting request 154 being addressed, have been allocated (e.g., mounted). If not, the pod provisioning process 300 can proceed back to any one or more of steps 302-308 to re-determine how to address the missed sub-request 258 and/or to report an error, such as by generating a notification 190 to be transmitted to and/or made available to a computer device associated with the user entity 152. If yes, the pod provisioning process 300 can proceed to step 312.

At step 312, the executing component 124 can cause instantiation of the pod 260. For example, the executing component 124 can generate one or more instantiation instructions 322 to be transmitted to and/or made available to the computer device 101 and/or the pod management system 150. The one or more instantiation instructions 322 can direct the instantiation of the pod 260. In such case, the computer device 101 and/or the pod management system 150 can execute the instantiation of the pod 260. In one or more other embodiments, the pod provisioning system 102 (e.g., the executing component 124) can perform the instantiation of the pod 260.

In one or more embodiments, in connection with step 312, the executing component 124 can generate one or more notifications 190 that can be transmitted to and/or made available to a computer device associated with a user entity 152 having initiated the pod hosting request 154 associated with the instantiation instructions 322. A notification 190 can comprise information and/or data defining information that lists how and/or whether or not each sub-request 158 of the pod hosting request 154 has been satisfied. A notification 190 can comprise indication of whether an optional sub-request 158 was not satisfied or was instead satisfied via use of a spoofed volume 264.

Turning back to FIG. 4, additionally, and/or alternatively, at step 410, the spoofing component 122 and/or executing component 124 can determine, at a specified re-evaluation frequency 450, whether or not the disk fault 420 has been rectified (e.g., if a disk fault 420 was the trigger for the persistent volume spoofing process 400). If the disk fault

420 has not been addressed (e.g., recovered, rectified, etc.), the evaluation at step 410 can be performed again according to the re-evaluation frequency 450. It is also noted that the re-evaluation frequency 450 can be performed on demand, such as in relation to a request from a computer device associated with a user entity 152 and/or administrator entity of any one or more of the non-limiting system 100 and/or architecture 200. Alternatively, if the disk fault 420 has been addressed (e.g., recovered, rectified, etc.), the process 400 can proceed to step 412.

In connection therewith, at step 412, the spoofing component 122 and/or executing component 124 can direct the pod provisioning system 102 to re-start the pod provisioning process 300, such as to allow for use of a true (e.g., accessible) persistent volume 162 in place of a spoofed volume 264 that is currently and/or was employed due to the disk fault 420.

In one or more embodiments, the executing component 124 likewise can direct the pod provisioning system 102 to re-start the pod provisioning process 300, such as to allow for use of a true (e.g., accessible) persistent volume 162 in place of a spoofed volume 264 due to lack of suitable hosting capacity 280. For example, a new node 260, increased hosting capacity 280, and/or the like can be made available. That is a change to the architecture 200 can trigger the executing component 124 to direct the provisioning system 102 to re-start the pod provisioning process 300. Additionally, and/or alternatively, the executing component 124 can direct the pod provisioning system 102 to re-start the pod provisioning process 300 based on an evaluation frequency based upon which the executing component 124 can determine if a change has been made to the architecture 200 that can allow for use of a true (e.g., accessible) persistent volume 162 in place of a spoofed volume 264.

Example Operations

As a first summary of the above description relative to FIGS. 1-4, turning now to FIGS. 5 and 6, a process flow comprising a set of operations for volume provisioning for pod instantiation. One or more elements, objects and/or components referenced in the process flow 500 can be those of schematics 100-400. Repetitive description of like elements and/or processes employed in previously described embodiments is omitted for sake of brevity.

At operation 502, the process flow 500 can comprise identifying, by a system (e.g., obtaining component 110), a pod hosting request (e.g., pod hosting request 154).

At operation 504, the process flow 500 can comprise, based on the pod hosting request, correlating, by the system (e.g., determining component 112), at least one sub-request, of the sub-requests, corresponding to the pod hosting request, to annotation data that indicates that the at least one sub-request is optional.

At operation 506, the process flow 500 can comprise determining, by the system (e.g., determining component 112), that the annotation data further indicates that failing to fulfill the at least one sub-request by failing to fulfill allocation of a respective persistent volume to the pod is not threshold likely to cause failure of initiation of hosting of the pod at the data node.

At operation 508, the process flow 500 can comprise, based on the pod hosting request, correlating, by the system (e.g., determining component 112), the sub-requests, corresponding to the pod hosting request, to ranking data that defines rankings for the sub-requests that are comparable to one another.

At operation 510, the process flow 500 can comprise, based on the pod hosting request, allocating, by the system (e.g., allocating component 120), persistent volumes of a data node to be hosted at a pod at the data node.

At operation 512, the process flow 500 can comprise determining, by the system (e.g., allocating component 120), that an allocation of persistent volumes fulfills less than all sub-requests corresponding to the pod hosting request.

At operation 514, the process flow 500 can comprise, alternatively to fulfilling the at least one sub-request by allocating a persistent volume, instead creating, the system (e.g., spoofing component 122), a fake volume using a loop device or other data construct.

At operation 516, the process flow 500 can comprise determining, by the system (e.g., executing component 124), whether or not all sub-requests have been satisfied. If yes, the process flow 500 can proceed to step 518. If not, the process flow 500 can proceed back to step 514. In one or more embodiments, the process flow 500 can additionally, and/or alternatively, proceed back to step 512.

At operation 518, the process flow 500 can comprise directing, by the system (e.g., executing component 124), hosting of the pod of the persistent volumes at the data node after the allocating of the persistent volumes to the pod.

At operation 520, the process flow 500 can comprise directing, by the system (e.g., executing component 124), hosting of the pod at the data node based on application of the rankings to hosting capacity available at the data node.

As a second summary of the above description relative to FIGS. 1-4, turning now to FIGS. 7 to 8, a process flow comprising a set of operations for volume provisioning for pod instantiation. One or more elements, objects and/or components referenced in the process flow 700 can be those of schematics 100-400. Repetitive description of like elements and/or processes employed in previously described embodiments is omitted for sake of brevity.

At operation 702, the process flow 700 can comprise accessing, by a system (e.g., obtaining component 110) comprising at least one processor (e.g., processor 106), a data store comprising request data defining sub-requests for inclusion of respective persistent volumes in a pod to be hosted at a first data node.

At operation 704, the process flow 700 can comprise determining, by the system (e.g., determining component 112), from the data store, ranking data associated with the sub-requests, wherein the ranking data defines respective rankings based on respective levels of importance of the inclusion of the respective persistent volumes.

At operation 706, the process flow 700 can comprise determining, by the system (e.g., determining component 112), from the data store, that at least one sub-request, of the sub-requests, is associated with annotation data that labels the at least one sub-request as optional.

At operation 708, the process flow 700 can comprise based on the sub-requests and the ranking data, assigning, by the system (e.g., annotating component 116), the respective rankings to first persistent volumes at the first data node and to other persistent volumes at the at least one second data node.

At operation 710, the process flow 700 can comprise identifying, by the system (e.g., identifying component 114), persistent volumes at the first data node that at least partially satisfy the pod hosting request and at the at least one second data node that at least partially satisfy the pod hosting request, the identifying resulting in identified persistent volumes.

At operation 712, the process flow 700 can comprise generating, by the system (e.g., determining component 112), scores based on the identifying of the identified persistent volumes.

At operation 714, the process flow 700 can comprise generating, by the system (e.g., scoring component 118), scores for a first data node and for at least one second data node, based on an aggregation of the respective rankings.

At operation 716, the process flow 700 can comprise generating, by the system (e.g., scoring component 118), a first score for the first data node being higher than at least one second score for the at least one second data node, wherein the first score for the first data node is based on non-assignment of at least one respective ranking relative to at least one sub-request of the sub-requests.

At operation 718, the process flow 700 can comprise allocating, by the system (e.g., allocating component 120), persistent volumes associated with the first data node to the pod, based on a higher score of the first data node as compared to a lower score of the at least one other node.

At operation 720, the process flow 700 can comprise satisfying, by the system (e.g., allocating component 120 and/or spoofing component 122), at least one sub-request, of the sub-requests, by initiating an action other than allocating a persistent volume of the first data node or of the at least one second data node to the pod.

At operation 722, the process flow 700 can comprise spoofing, by the system (e.g., spoofing component 122), a creation of a persistent volume for at least one of the sub-requests comprising mounting a non-volume construct to the pod.

At operation 724, the process flow 700 can comprise determining, by the system (e.g., executing component 124), whether or not all sub-requests have been satisfied. If yes, the process flow 600 can proceed to end. If not, the process flow 600 can proceed back to step 722. In one or more embodiments, the process flow 600 can additionally, and/or alternatively, proceed back to step 718 and/or step 720.

For simplicity of explanation, the computer-implemented methodologies and/or processes provided herein are depicted and/or described as a series of acts. The subject innovation is not limited by the acts illustrated and/or by the order of acts, for example acts can occur in one or more orders and/or concurrently, and with other acts not presented and described herein. The operations of process flows of the figures provided herein are example operations, and there can be one or more embodiments that implement more or fewer operations than are depicted.

Furthermore, not all illustrated acts can be utilized to implement the computer-implemented methodologies in accordance with the described subject matter. In addition, the computer-implemented methodologies could alternatively be represented as a series of interrelated states via a state diagram or events. Additionally, the computer-implemented methodologies described hereinafter and throughout this specification are capable of being stored on an article of manufacture to facilitate transporting and transferring the computer-implemented methodologies to computers. The term article of manufacture, as used herein, is intended to encompass a computer program accessible from any machine-readable device or storage media.

In summary, described is technology that facilitates provisioning of persistent volumes 162 for pods 260 to be hosed at a node 160 of a computer system 101. An example system 102 comprises at least one processor 106, and at least one memory 104 that stores executable instructions that, when executed by the at least one processor 106, facilitate performance of operations, comprising responding to a pod hosting request 154 that comprises request data 156 defining sub-requests 158 for inclusion of respective persistent volumes 162 in a pod 260, identifying persistent volumes 162 that at least partially satisfy the pod hosting request 154, the persistent volumes 162 being identified as being available via a data node 160, and allocating the persistent volumes 162 to the pod 260 to be hosted by the data node 160, wherein at least one sub-request 158, of the sub-requests 158, is satisfied by an operation (e.g., persistent volume spoofing process 400) other than allocating a respective persistent volume 162 of the respective persistent volumes 162 to the pod 260.

Indeed, in view of the one or more embodiments described herein, a practical application of the above-indicated method, system and/or non-transitory computer-readable medium can be an ability to initiate hosting of a pod even in absence of a requested persistent volume. This could be, for example, in response to a failure of a disk associated with a persistent volume. The configuration, additionally and/or alternatively, can comprise ability to manage the pod by a pod management system along with the management of at least one other pod having a non-identical configuration to the pod. This can be accomplished without instead employing limited capacity for pods with such non-identical configurations, with varying hardware, software and/or firmware, and/or from varying generations of product.

Another example benefit of one or more of the above-indicated method, system and/or non-transitory computer-readable medium can be an ability to provide a spoofed persistent volume to account for unavailable capacity of a node, low priority of instantiation of a particular persistent volume, and/or failure of a disk associated with a persistent volume. In this way, a pod does not remain in a pending state indefinitely until conditions are met.

These are useful and practical applications of computers, thus providing enhanced (e.g., improved and/or optimized) provisioning of persistent volumes for containerized workloads. In one or more embodiments, a framework described herein can provide the above-noted operations based on a low knowledge barrier for a user entity. That is, to instantiate a pod, a user entity need not have deep knowledge regarding investigation of a failed disk, regarding particular differences in node configurations, and/or regarding how to spoof a persistent volume. Rather, operations related thereto can be performed automatically by the one or more embodiments described herein. Indeed, the automatic operations can provide for flexible, adaptable and/or seamless provisioning of a pod in association with such low knowledge barrier for a user entity requesting the provisioning. Overall, such tools can constitute a concrete and tangible technical and/or physical improvement in the fields of pod or cluster instantiation, comprising volume provisioning.

Furthermore, one or more embodiments described herein can be employed in a real-world system based on the disclosed teachings. For example, one or more embodiments described herein can function with a computer system and/or one or more servers for internet, cloud and/or internal/external networks to perform the aforementioned volume provisioning, fake volume generation, volume annotation, sub-request ranking and/or node scoring.

Further, one or more embodiments described herein are inherently and/or inextricably tied to computer technology and cannot be implemented outside of a computing environment. For example, one or more processes performed by one or more embodiments described herein can more efficiently, and/or more feasibly, provide computer-aided and automatic provisioning of volumes for use in instantiation of a pod. This automatic provisioning can be performed even in the case of a disk failure and/or using hardware, software and/or firmware of varying generations and/or configurations. Systems, computer-implemented methods and/or computer program products facilitating performance of these processes are of great utility in the fields of containerized workloads, volume provisioning and/or pod/cluster instantiation and cannot be equally practicably implemented in a sensible way outside of a computing environment.

One or more embodiments described herein can employ hardware and/or software to solve problems that are highly technical, that are not abstract, and that cannot be performed as a set of mental acts by a human. For example, a human, or even thousands of humans, cannot efficiently, accurately and/or effectively access computer-stored data, generate computer data, generate and/or employ a data construct such as a loop device, and/or communicate with a computer-based interface at a digital level of computerized communication, as the one or more embodiments described herein can facilitate these processes. For example, a human, or even thousands of humans, cannot efficiently, accurately and/or effectively allocate digital volumes of one or more nodes from a plurality of dozens or even hundreds of volumes and/or nodes, using varyingly configured hardware, software and/or firmware, let alone provide such determining at a speed facilitating efficient volume provisioning and/or pod/cluster instantiation at a node of computer system as can the one or more embodiments described herein. And, neither can the human mind nor a human with pen and paper automatically perform one or more of the processes as conducted by one or more embodiments described herein.

The systems and/or devices have been (and/or will be further) described herein with respect to interaction between one or more components. Such systems and/or components can include those components or sub-components specified therein, one or more of the specified components and/or sub-components, and/or additional components. Sub-components can be implemented as components communicatively coupled to other components rather than included within parent components. One or more components and/or sub-components can be combined into a single component providing aggregate functionality. The components can interact with one or more other components not described herein for the sake of brevity, but known by those of skill in the art.

In one or more embodiments, one or more of the processes described herein can be performed by one or more specialized computers (e.g., a specialized processing unit, a specialized classical computer, and/or another type of specialized computer) to execute defined tasks related to the one or more technologies describe above. One or more embodiments described herein and/or components thereof can be employed to solve new problems that arise through advancements in technologies mentioned above, employment of cloud operation systems, computer architecture and/or another technology.

One or more embodiments described herein can be fully operational towards performing one or more other functions (e.g., fully powered on, fully executed and/or another function) while also performing the one or more operations described herein.

The paragraphs that follow provide additional summary reciting an example system, an example method and an example non-transitory machine-readable medium.

The example system comprises at least one processor, and at least one memory that stores executable instructions that, when executed by the at least one processor, facilitates performance of operations. The operations comprise responding to a pod hosting request that comprises request data defining sub-requests for inclusion of respective persistent volumes in a pod, identifying persistent volumes that at least partially satisfy the pod hosting request, the persistent volumes being identified as being available via a data node, and allocating the persistent volumes to the pod to be hosted by the data node, wherein at least one sub-request, of the sub-requests, is satisfied by an operation other than allocating a respective persistent volume of the respective persistent volumes to the pod.

With respect to the example system, the operation other than the allocating of the respective persistent volume to the pod can comprise identifying the at least one sub-request as corresponding to annotation data that labels the at least one sub-request as optional.

With respect to the example system, the operation other than the allocating of the respective persistent volume to the pod comprises spoofing a creation of the respective persistent volume comprising mounting a non-volume construct to the pod.

With respect to the example system, the non-volume construct can comprise a loop device.

With respect to the example system, the operations can further comprise, in response to a temporary disk fault being determined to have occurred at the data node, reidentifying the persistent volumes for the pod hosting request, resulting in reidentified persistent volumes, and allocating the reidentified persistent volumes to the pod, wherein the allocating comprises allocating at least one respective persistent volume, of the reidentified persistent volumes, to satisfy at least one sub-request of the sub-requests instead of satisfying the at least one sub-request by the operation other than the allocating of the respective persistent volume to the pod.

With respect to the example system, the reidentifying of the persistent volumes for the pod hosting request can comprise identifying the reidentified persistent volumes as being from any one or more of: one or more of the persistent volumes available via the data node, one or more different persistent volumes available via the data node other than the persistent volumes, or one or more additional persistent volumes from a different data node other than the data node.

With respect to the example system, the operations can further comprise identifying ranking data, associated with the pod hosting request, that defines respective rankings for the sub-requests of the request data.

With respect to the example system, the operations can further comprise analyzing configuration data associated with the data node and with at least one other data node, different from the data node, and generating a first score for the data node and generating at least one second score for the at least one other data node, based on the configuration data and on an aggregation of rankings defined by ranking data associated with the sub-requests of the request data, wherein the first score for the data node is higher than the at least one second score for the at least one other data node.

With respect to the example system, the operations can further comprise instantiating the pod in response to the data node being determined to comprise a faulted disk comprising, or that comprised, a persistent volume that otherwise, absent the faulted disk, would have satisfied a specified sub-request of the sub-requests.

The example method comprises accessing, by a system comprising at least one processor, a data store comprising request data defining sub-requests for inclusion of respective persistent volumes in a pod to be hosted at a first data node, and determining, from the data store, ranking data associated with the sub-requests, wherein the ranking data defines respective rankings based on respective levels of importance of the inclusion of the respective persistent volumes. The example method can further comprise generating scores for a first data node and for at least one second data node, based on an aggregation of the respective rankings.

With the example method, at least one sub-request, of the sub-requests, can be associated with annotation data that labels the at least one sub-request as optional.

The example method can further comprise identifying persistent volumes at the first data node that at least partially satisfy the pod hosting request and at the at least one second data node that at least partially satisfy the pod hosting request, the identifying resulting in identified persistent volumes, wherein the scores are generated based on the identifying of the identified persistent volumes.

The example method can further comprise allocating persistent volumes associated with the first data node to the pod, based on a higher score of the first data node as compared to a lower score of the at least one other node.

The example method can further comprise satisfying at least one sub-request, of the sub-requests, by initiating an action other than allocating a persistent volume of the first data node or of the at least one second data node to the pod.

The example method can further comprise spoofing a creation of a persistent volume for at least one of the sub-requests comprising mounting a non-volume construct to the pod.

With the example method, the scoring can comprise, based on the sub-requests and the ranking data, assigning the respective rankings to first persistent volumes at the first data node and to other persistent volumes at the at least one second data node, wherein a first score for the first data node is higher than at least one second score for the at least one second data node, and wherein the first score for the first data node is based on non-assignment of at least one respective ranking relative to at least one sub-request of the sub-requests.

In turn, the example non-transitory machine-readable medium can comprise executable instructions that, when executed by at least one processor facilitate performance of operations. The operations comprise, based on a pod hosting request, allocating persistent volumes of a data node to a pod to be hosted at the data node, and directing hosting of the pod of the persistent volumes at the data node after the allocating of the persistent volumes to the pod, wherein the persistent volumes have been determined to fulfill less than all sub-requests corresponding to the pod hosting request.

The operations can further comprise correlating at least one sub-request, of the sub-requests, corresponding to the pod hosting request, to annotation data that indicates that the at least one sub-request is optional, wherein the annotation data further indicates that failing to fulfill the at least one sub-request by failing to fulfill allocation of a respective persistent volume to the pod is not threshold likely to cause failure of initiation of hosting of the pod at the data node.

The operations can further comprise alternatively to fulfilling the at least one sub-request by allocating a persistent volume, instead creating a fake volume using a loop device or other data construct.

The operations can further comprise correlating the sub-requests, corresponding to the pod hosting request, to ranking data that defines rankings for the sub-requests that are comparable to one another, wherein the hosting of the pod at the data node is based on application of the rankings to hosting capacity available at the data node.

Example Operating Environment

FIG. 9 is a schematic block diagram of an operating environment 900 with which the described subject matter can interact. The operating environment 900 comprises one or more remote component(s) 910. The remote component(s) 910 can be hardware and/or software (e.g., threads, processes, computing devices). In one or more embodiments, remote component(s) 910 can be a distributed computer system, connected to a local automatic scaling component and/or programs that use the resources of a distributed computer system, via communication framework 940. Communication framework 940 can comprise wired network devices, wireless network devices, mobile devices, wearable devices, radio access network devices, gateway devices, femtocell devices, servers, etc.

The operating environment 900 also comprises one or more local component(s) 920. The local component(s) 920 can be hardware and/or software (e.g., threads, processes, computing devices). In one or more embodiments, local component(s) 920 can comprise an automatic scaling component and/or programs that communicate/use the remote resources 910 and 920, etc., connected to a remotely located distributed computing system via communication framework 940.

One possible communication between a remote component(s) 910 and a local component(s) 920 can be in the form of a data packet adapted to be transmitted between two or more computer processes. Another possible communication between a remote component(s) 910 and a local component(s) 920 can be in the form of circuit-switched data adapted to be transmitted between two or more computer processes in radio time slots. The operating environment 900 comprises a communication framework 940 that can be employed to facilitate communications between the remote component(s) 910 and the local component(s) 920, and can comprise an air interface, e.g., interface of a UMTS network, via an LTE network, etc. Remote component(s) 910 can be operably connected to one or more remote data store(s) 950, such as a hard drive, solid state drive, subscriber identity module (SIM) card, electronic SIM (eSIM), device memory, etc., that can be employed to store information on the remote component(s) 910 side of communication framework 940. Similarly, local component(s) 920 can be operably connected to one or more local data store(s) 930, that can be employed to store information on the local component(s) 920 side of communication framework 940.

Example Computing Environment

Figure 10:
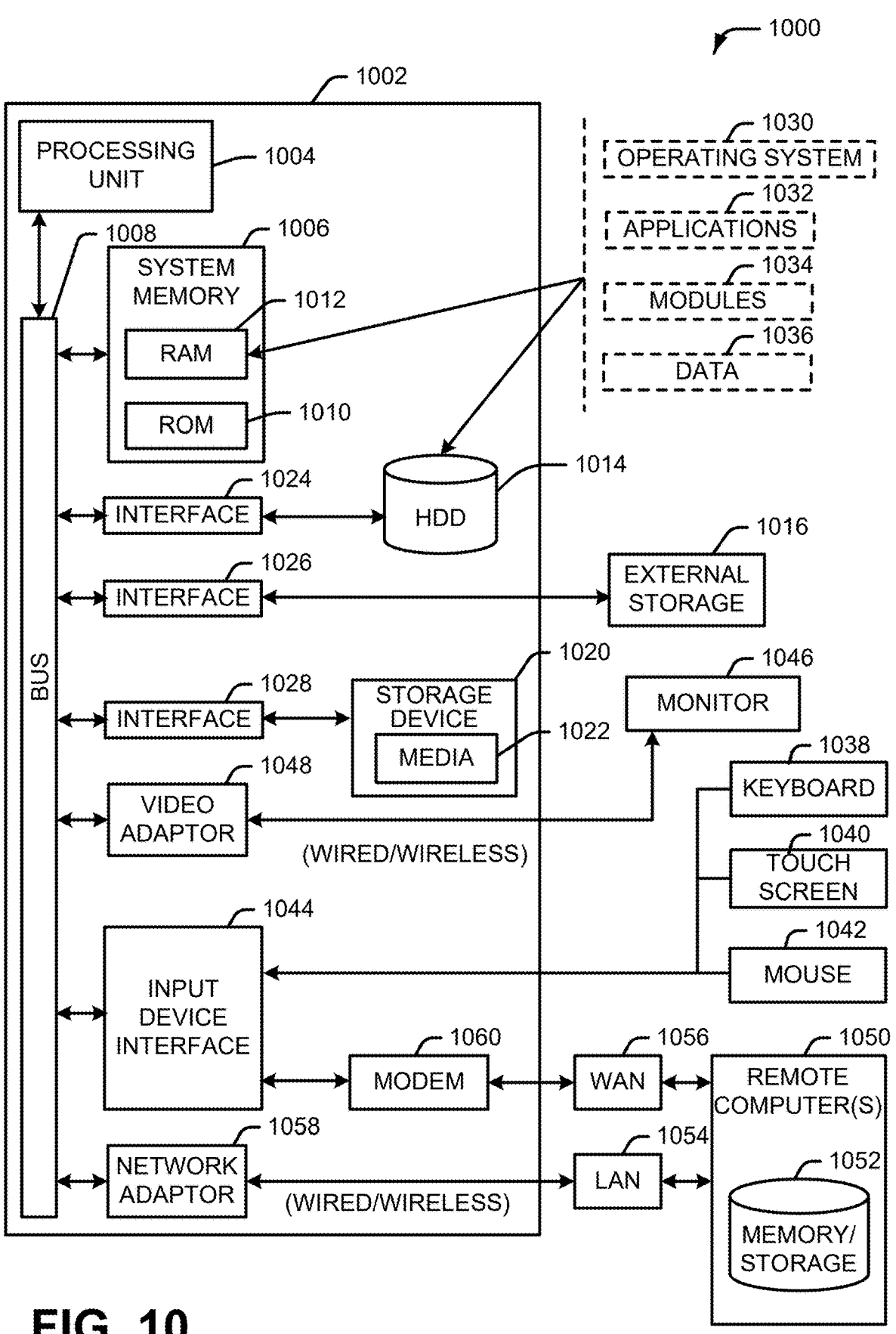
FIG. 10 illustrates an example schematic block diagram of a computing environment with which the subject matter described herein can interact and/or be implemented at least in part.

In order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform tasks or implement abstract data types. Moreover, the methods can be practiced with other computer system configurations including single-processor or multiprocessor computer systems, minicomputers, mainframe computers, Internet of Things (IOT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory, or computer-readable media, exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries, or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

Referring still to FIG. 10, the example computing environment 1000 which can implement one or more embodiments described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a nonvolatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), and can include one or more external storage devices 1016 (e.g., a magnetic floppy disk drive (FDD) 1016, a memory stick or flash drive reader, a memory card reader, etc.). While the internal HDD 1014 is illustrated as located within the computer 1002, the internal HDD 1014 can also be configured for external use in a suitable chassis (not shown). Additionally, while not shown in computing environment 1000, a solid-state drive (SSD) could be used in addition to, or in place of, an HDD 1014.

Other internal or external storage can include at least one other storage device 1020 with storage media 1022 (e.g., a solid-state storage device, a nonvolatile memory device, and/or an optical disk drive that can read or write from removable media such as a CD-ROM disc, a DVD, a BD, etc.). The external storage 1016 can be facilitated by a network virtual machine. The HDD 1014, external storage device 1016 and storage device (e.g., drive) 1020 can be connected to the system bus 1008 by an HDD interface 1024, an external storage interface 1026 and a drive interface 1028, respectively.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera, a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can also be connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer 1050. The remote computer 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. The network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a defined structure as with a conventional network or simply an ad hoc communication between at least two devices.

CONCLUSION

The above description of illustrated embodiments of the one or more embodiments described herein, comprising what is described in the Abstract, is not intended to be exhaustive or to limit the described embodiments to the precise forms described. While one or more specific embodiments and examples are described herein for illustrative purposes, various modifications are possible that are considered within the scope of such embodiments and examples, as those skilled in the relevant art can recognize.

In this regard, while the described subject matter has been described in connection with various embodiments and corresponding figures, where applicable, other similar embodiments can be used or modifications and additions can be made to the described embodiments for performing the same, similar, alternative, or substitute function of the described subject matter without deviating therefrom. Therefore, the described subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures to optimize space usage or enhance performance of user equipment. A processor can also be implemented as a combination of computing processing units.

As used in this application, the terms "component," "system," "platform," "layer," "selector," "interface," and the like are intended to refer to a computer-related entity or an entity related to an operational apparatus with one or more functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of these instances.

While the embodiments are susceptible to various modifications and alternative constructions, certain illustrated implementations thereof are shown in the drawings and have been described above in detail. However, there is no intention to limit the various embodiments to the one or more specific forms described, but on the contrary, the intention is to cover all modifications, alternative constructions, and equivalents falling within the spirit and scope.

In addition to the various implementations described herein, other similar implementations can be used, or modifications and additions can be made to the described implementation for performing the same or equivalent function of the corresponding implementation without deviating therefrom. Still further, multiple processing chips or multiple devices can share the performance of one or more functions described herein, and similarly, storage can be implemented across different devices. Accordingly, the various embodiments are not to be limited to any single implementation, but rather are to be construed in breadth, spirit, and scope in accordance with the appended claims.

What is claimed is:

1. A system, comprising:

at least one processor; and at least one memory that stores executable instructions that, when executed by the at least one processor, facilitates performance of operations, comprising:

responding to a pod hosting request that comprises request data defining sub-requests for inclusion of respective persistent volumes in a pod;

identifying persistent volumes that at least partially satisfy the pod hosting request, the persistent volumes being identified as being available via a data node;

identifying at least one sub-request, of the sub-requests, as corresponding to annotation data; and allocating the persistent volumes to the pod to be hosted by the data node, wherein the at least one sub-request, of the sub-requests, is satisfied by an operation other than allocating a respective persistent volume of the respective persistent volumes to the pod, and wherein the operation is based on the annotation data.

2. The system of claim 1, wherein the annotation data labels the at least one sub-request as optional.

3. The system of claim 1, wherein the annotation data labels the at least one sub-request as to be satisfied, and wherein the operation other than the allocating of the respective persistent volume to the pod comprises:

spoofing a creation of the respective persistent volume comprising mounting a non-volume construct to the pod.

4. The system of claim 3, wherein the non-volume construct comprises a loop device.

5. The system of claim 3, wherein the operations further comprise:

in response to a temporary disk fault being determined to have occurred at the data node, reidentifying the persistent volumes for the pod hosting request, resulting in reidentified persistent volumes; and allocating the reidentified persistent volumes to the pod, wherein the allocating comprises allocating at least one respective persistent volume, of the reidentified persistent volumes, to satisfy at least one sub-request of the sub-requests instead of satisfying the at least one sub-request by the operation other than the allocating of the respective persistent volume to the pod.

6. The system of claim 5, wherein the reidentifying of the persistent volumes for the pod hosting request comprises identifying the reidentified persistent volumes as being from any one or more of: one or more of the persistent volumes available via the data node, one or more different persistent volumes available via the data node other than the persistent volumes, or one or more additional persistent volumes from a different data node other than the data node.

7. The system of claim 1, wherein the operations further comprise:

identifying ranking data, associated with the pod hosting request, that defines respective rankings for the sub-requests of the request data.

8. The system of claim 1, wherein the operations further comprise:

analyzing configuration data associated with the data node and with at least one other data node, different from the data node; and generating a first score for the data node and generating at least one second score for the at least one other data node, based on the configuration data and on an aggregation of rankings defined by ranking data associated with the sub-requests of the request data, wherein the first score for the data node is higher than the at least one second score for the at least one other data node.

9. The system of claim 1, wherein the operations further comprise:

instantiating the pod in response to the data node being determined to comprise a faulted disk comprising, or that comprised, a persistent volume that otherwise, absent the faulted disk, would have satisfied a specified sub-request of the sub-requests.

10. The system of claim 1, wherein the annotation data further indicates that failing to fulfill the at least one first sub-request by failing to fulfill allocation of a respective persistent volume to the pod is not threshold likely to cause failure of initiation of hosting of the pod at the data node.

11. A method, comprising:

accessing, by a system comprising at least one processor, a data store comprising request data defining sub-requests for inclusion of respective persistent volumes in a pod to be hosted at a first data node;

determining, from the data store, ranking data associated with the sub-requests, wherein the ranking data defines respective rankings based on respective levels of importance of the inclusion of the respective persistent volumes;

generating scores for a first data node and for at least one second data node, based on an aggregation of the respective rankings;

identifying at least one sub-request, of the sub-requests, as corresponding to annotation data; and satisfying the at least one sub-request, of the sub-requests, by initiating an action other than allocating a persistent volume of the first data node or of the at least one second data node to the pod, wherein the action is based on the annotation data.

12. The method of claim 11, wherein the annotation data labels the at least one sub-request as optional.

13. The method of claim 11, further comprising:

identifying persistent volumes at the first data node that at least partially satisfy the pod hosting request and at the at least one second data node that at least partially satisfy the pod hosting request, the identifying resulting in identified persistent volumes, wherein the scores are generated based on the identifying of the identified persistent volumes.

14. The method of claim 11, further comprising:

allocating persistent volumes associated with the first data node to the pod, based on a higher score of the first data node as compared to a lower score of the at least one other node.

15. The method of claim 11, wherein the annotation data labels the at least one sub-request as to be satisfied, and wherein the method further comprises:

spoofing a creation of a persistent volume for at least one of the sub-requests comprising mounting a non-volume construct to the pod.

16. The method of claim 11, wherein the scoring comprises:

based on the sub-requests and the ranking data, assigning the respective rankings to first persistent volumes at the first data node and to other persistent volumes at the at least one second data node, wherein a first score for the first data node is higher than at least one second score for the at least one second data node, and wherein the first score for the first data node is based on non-assignment of at least one respective ranking relative to at least one sub-request of the sub-requests.

17. A non-transitory machine-readable medium, comprising executable instructions that, when executed by at least one processor facilitate performance of operations, comprising:

based on a pod hosting request, allocating persistent volumes of a data node to be hosted at a pod at the data node, wherein the allocating comprises identifying, at least one sub-request, of sub-requests corresponding to the pod hosting request, as corresponding to annotation data, wherein the allocating further comprises satisfying the least one sub-request by performing an operation other than allocating a respective persistent volume, of the persistent volumes, to the pod, and wherein the operation is based on the annotation data; and directing hosting of the pod of the persistent volumes at the data node after the allocating of the persistent volumes to the pod, wherein the persistent volumes have been determined to fulfill less than all sub-requests corresponding to the pod hosting request based on the performing of the operation.

18. The non-transitory machine-readable medium of claim 17, wherein the annotation data indicates that the at least one sub-request is optional, and wherein the annotation data further indicates that failing to fulfill the at least one sub-request by failing to fulfill allocation of a respective persistent volume to the pod is not threshold likely to cause failure of initiation of hosting of the pod at the data node.

19. The non-transitory machine-readable medium of claim 17, wherein the annotation data labels the at least one sub-request as to be satisfied, and wherein the operations further comprise:

alternatively to fulfilling the at least one sub-request by allocating a persistent volume, instead creating a fake volume using a loop device or other data construct.

20. The non-transitory machine-readable medium of claim 17, wherein the operations further comprise:

correlating the sub-requests, corresponding to the pod hosting request, to ranking data that defines rankings for the sub-requests that are comparable to one another, wherein the hosting of the pod at the data node is based on application of the rankings to hosting capacity available at the data node.

\*    \*    \*    \*    \*